(12) United States Patent
Wang

(10) Patent No.: US 12,479,533 B2
(45) Date of Patent: Nov. 25, 2025

(54) PEDAL FORCE DETECTION MECHANISM FOR ELECTRIC-ASSISTED BICYCLE

(71) Applicant: MOTIVE POWER INDUSTRY CO., LTD., Changhua County (TW)

(72) Inventor: John-Sun Wang, Taipei (TW)

(73) Assignee: MOTIVE POWER INDUSTRY CO., LTD., Changhua County (TW)

( * ) Notice: Subject to any disclaimer, the term of this patent is extended or adjusted under 35 U.S.C. 154(b) by 34 days.

(21) Appl. No.: 18/657,818

(22) Filed: May 8, 2024

(65) Prior Publication Data
US 2025/0019030 A1    Jan. 16, 2025

(30) Foreign Application Priority Data
Jul. 13, 2023   (TW) ................................ 112126153

(51) Int. Cl.
*B62M 6/50*   (2010.01)
*B62M 6/55*   (2010.01)
*G01L 5/22*   (2006.01)

(52) U.S. Cl.
CPC ............... *B62M 6/50* (2013.01); *B62M 6/55* (2013.01); *G01L 5/225* (2013.01)

(58) Field of Classification Search
CPC ...................................................... B62M 6/50
See application file for complete search history.

(56) References Cited

U.S. PATENT DOCUMENTS

| 6,080,073 A | * | 6/2000 | Liu | B62M 6/55 |
| | | | | 180/206.3 |
| 2018/0118304 A1 | * | 5/2018 | Greven | B62M 3/003 |
| 2020/0361566 A1 | * | 11/2020 | He | F16D 41/30 |
| 2021/0381544 A1 | * | 12/2021 | Li | B62M 6/50 |

FOREIGN PATENT DOCUMENTS

| CN | 106428394 A | * | 2/2017 | .............. B62M 6/55 |
| TW | I769802 B | | 7/2022 | |

* cited by examiner

*Primary Examiner* — Daniel D Yabut

(57) ABSTRACT

A pedal force detection mechanism for an electric-assisted bicycle includes a torque-transmitting member, a main thrust bearing, a strain sensing assembly, and a main drive gear. The torque-transmitting member transmits and diverts a torque along a crankshaft's axial direction. The main thrust bearing abuts against the torque-transmitting member to transmit the diverted torque. The strain sensing assembly has a strain gauge, resilient ring-shaped base, and supporting annular base. The supporting annular base abuts against a shaft housing. An axial-strain gap is defined between the supporting annular base and the main thrust bearing. The resilient ring-shaped base is fitted between the main thrust bearing and the supporting annular base. A main gear and an internally-connected ring body of the main drive gear are integrally formed with each other. An axial-movement gap is defined between the torque-transmitting member and the internally-connected ring body.

5 Claims, 11 Drawing Sheets

A-A

PEDAL FORCE DETECTION MECHANISM FOR ELECTRIC-ASSISTED BICYCLE

CROSS-REFERENCE TO RELATED APPLICATION

This non-provisional application claims priority under 35 U.S.C. § 119 (a) on Patent Application No(s). 112126153 filed in Taiwan, R.O.C. on Jul. 13, 2023, the entire contents of which are hereby incorporated by reference.

BACKGROUND OF THE INVENTION

1. Field of the Invention

The present disclosure relates to a pedal force detection mechanism for an electric-assisted bicycle, and in particular to a pedal force detection pedal force detection mechanism for detecting pedal force to activate an auxiliary motor of an electric-assisted bicycle and thus supply auxiliary power to a crankshaft of the electric-assisted bicycle.

2. Description of the Related Art

Electric-assisted bicycles, whose use is on the rise worldwide in recent years, come with electric-assisted motors and batteries. The electric-assisted bicycles enable cyclists to ride along steep or rugged roads easily and effortlessly, as the cyclists can exert a pedal force of variable magnitude on foot pedals to cause the electric-assisted motors to generate considerable auxiliary power.

The magnitude of the pedal force is conventionally sensed with a torque sensing assembly disposed outside the bushing of the bearing of the crankshaft of the electric-assisted bicycle to sense any variations in the torque to determine whether to start the motor. However, many cyclists complain that they are denied access to appropriate auxiliary power while riding electric-assisted bicycles whenever a variation in the pedal force falls outside the sensitivity or sensing range of the torque sensing assembly. TWI769802 discloses a pedal force detection mechanism for an electric-assisted bicycle.

BRIEF SUMMARY OF THE INVENTION

In view of the aforesaid drawbacks of the prior art, it is an objective of the present disclosure to provide a pedal force detection mechanism for an electric-assisted bicycle to sufficiently respond to a variation in pedal force with a view to efficiently and accurately supplying auxiliary power.

To achieve the above and other objectives, the present disclosure provides a pedal force detection mechanism for an electric-assisted bicycle, adapted to be received in a shaft housing of the electric-assisted bicycle to coordinate with a crankshaft and connect to an auxiliary power assembly. The crankshaft is movably disposed at the shaft housing. The pedal force detection mechanism comprises a pedal force diverting portion for transmitting a pedal force of the crankshaft unidirectionally and diverting the pedal force along an axial direction of the crankshaft, a main thrust bearing for abutting against the pedal force diverting portion to transmit the diverted pedal force, a strain sensing assembly having a strain gauge, a resilient ring-shaped base and a supporting annular base, with the supporting annular base disposed outside of the torque-transmitting member and abutting against the shaft housing, allowing an axial-strain gap to be defined between the supporting annular base and the main thrust bearing, the resilient ring-shaped base being disposed outside the supporting annular base and fitted between the main thrust bearing and the supporting annular base, the strain gauge being disposed at the resilient ring-shaped base and in signal connection with the auxiliary power assembly; and a main drive gear movably disposed between the crankshaft and the shaft housing and having a main gear, an internally-connected ring body and an outer connection ring, the internally-connected ring body being integrally formed with the main gear and located on an inner side of the main gear, the externally-connected ring body being fixedly connected to an outer side of the main gear, wherein the torque-transmitting member and the internally-connected ring body rotate synchronously, and an axial-movement gap is defined between the torque-transmitting member and the internally-connected ring body.

In an embodiment, the main thrust bearing is a ball thrust bearing.

In an embodiment, the supporting annular base has a supporting cylindrical body and a supporting annular flange, with the axial-strain gap defined between a side of the supporting cylindrical body and the main thrust bearing, and another side of the supporting cylindrical body is fixedly connected to the supporting annular flange, allowing the supporting annular flange to be fitted between the resilient ring-shaped base and the shaft housing.

In an embodiment, the main drive gear has a first thrust bearing, a second thrust bearing, an adjustment nut, and a fixation nut, with the first thrust bearing fitted between the shaft housing and the main gear, the second thrust bearing fitted between the main gear and the adjustment nut, the adjustment nut is fastened to the crankshaft, and the fixation nut fastened to the crankshaft and abutting against the adjustment nut, allowing a fastening direction of the fixation nut to be opposite to a fastening direction of the adjustment nut.

In an embodiment, the pedal force detection mechanism further comprises a rotation sensor unit, and the rotation sensor unit has a sensor, a annular magnet, an annular gripping component, a third thrust bearing and a first shaft bearing, the annular gripping component being fixedly fitted to the crankshaft, the third thrust bearing being fitted between the annular gripping component and the torque-transmitting member, the first shaft bearing being disposed between the shaft housing and the annular gripping component, the annular magnet being disposed at the annular gripping component, and the sensor being disposed at the shaft housing to sense the annular magnet.

Therefore, according to the disclosure, the pedal force detection mechanism for an electric-assisted bicycle sufficiently responds to a variation in a treading force with a view to supplying auxiliary power.

DETAILED DESCRIPTION OF THE INVENTION

Figure 1:
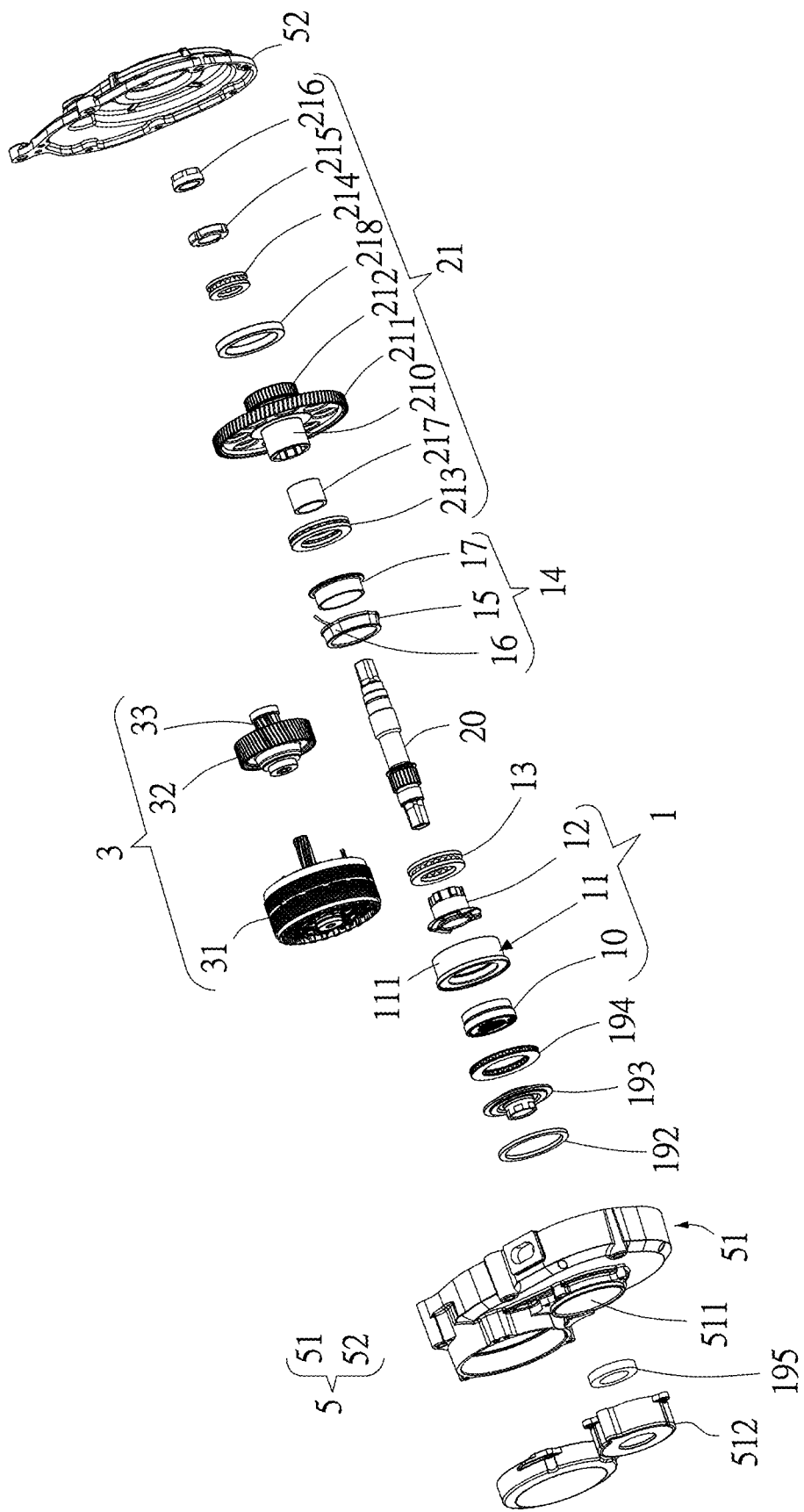
FIG. 1 is a schematic view of relative positions of a pedal force detection mechanism, crankshaft, auxiliary power assembly, and shaft housing according to an embodiment of the present disclosure.
Figure 2:
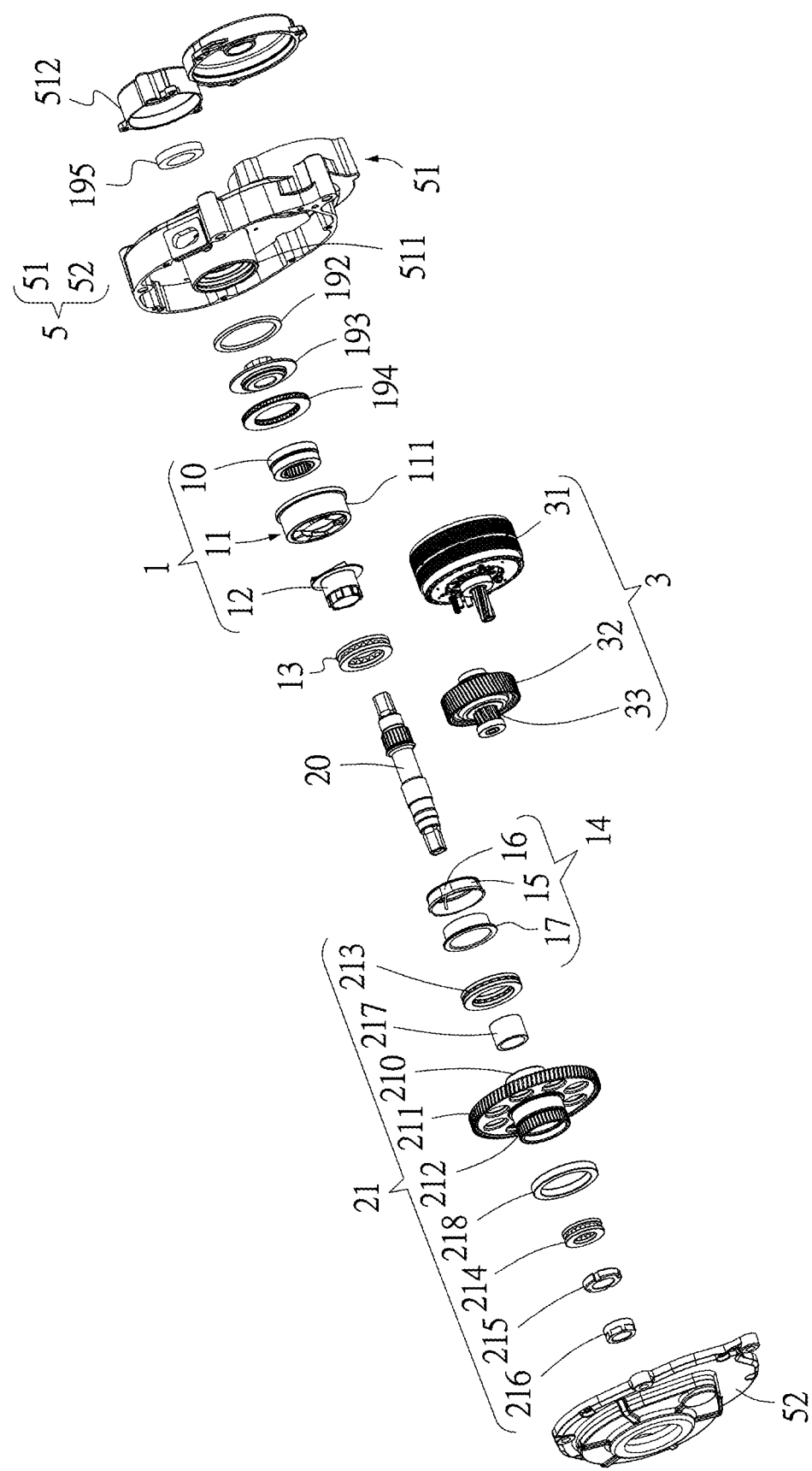
FIG. 2 is another schematic view of relative positions of the pedal force detection mechanism, crankshaft, auxiliary power assembly, and shaft housing according to an embodiment of the present disclosure.
Figure 3:
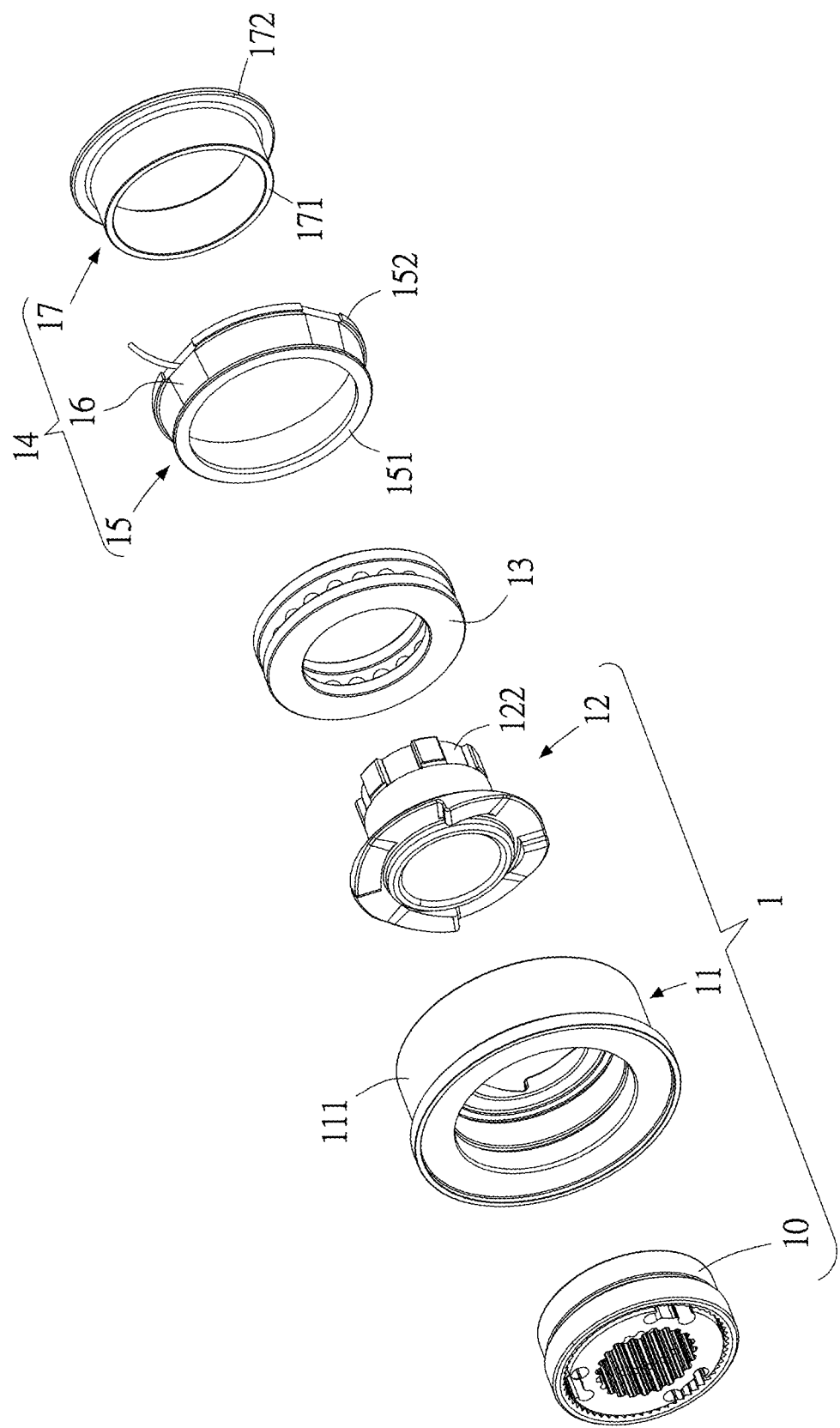
FIG. 3 is a schematic view of relative positions of a torque-transmitting member, main thrust bearing, and strain sensing assembly according to an embodiment of the present disclosure.
Figure 4:
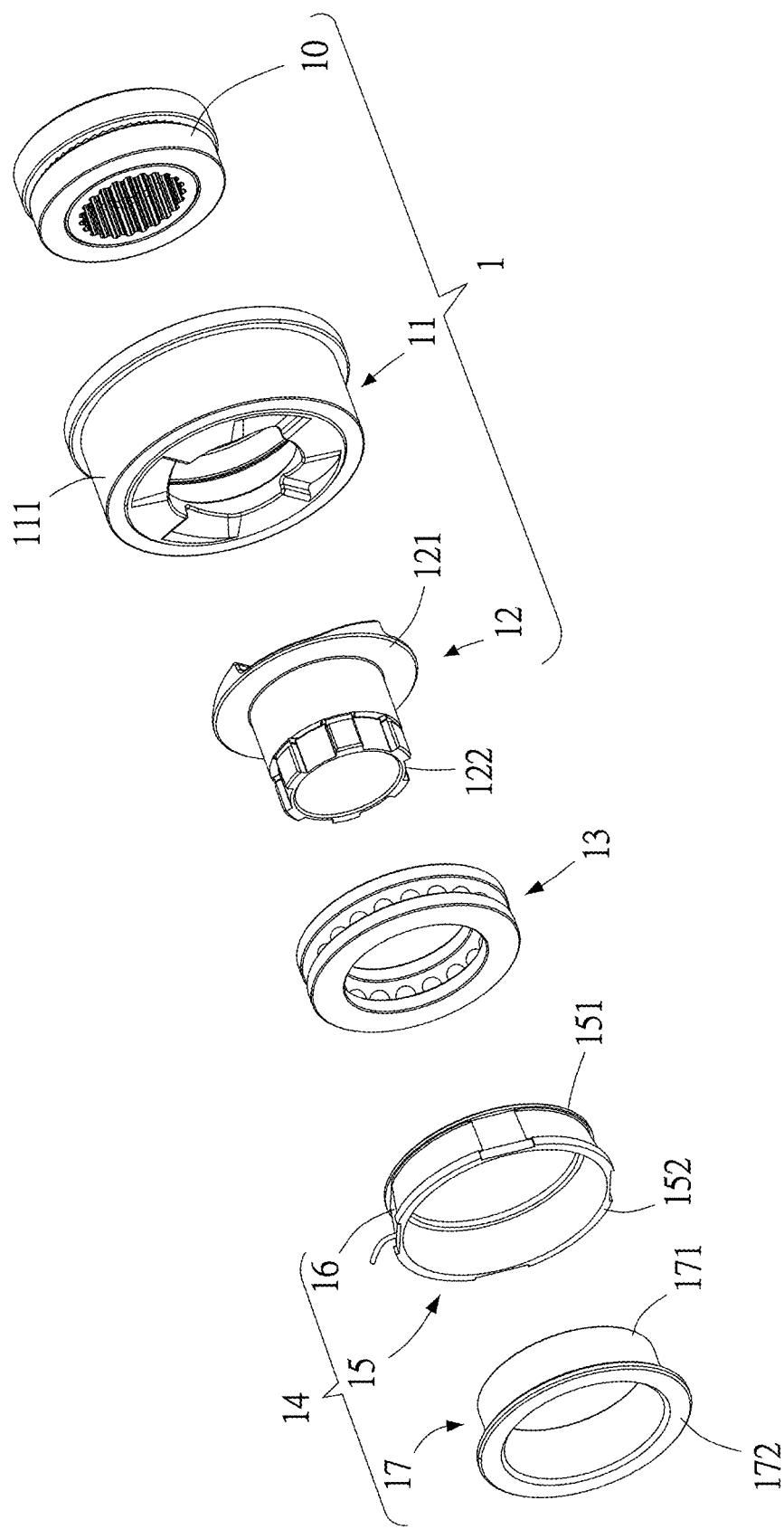
FIG. 4 is another schematic view of relative positions of the torque-transmitting member, main thrust bearing, and strain sensing assembly according to an embodiment of the present disclosure.
Figure 6:
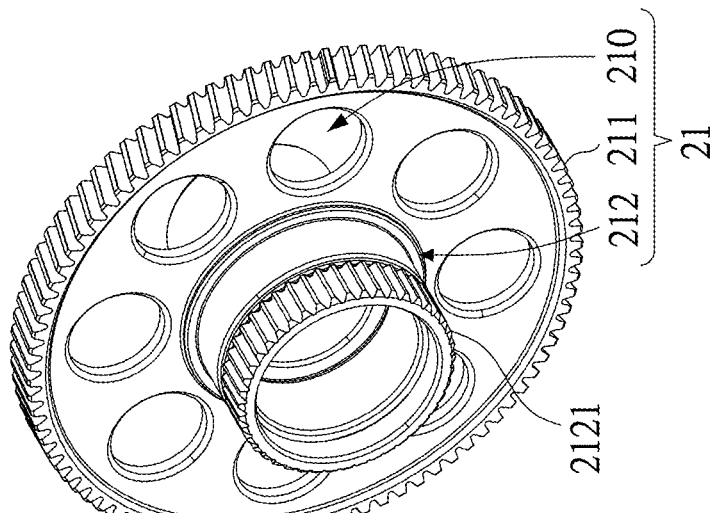
FIG. 6 is another perspective view of the main drive gear according to an embodiment of the present disclosure.
Figure 5:
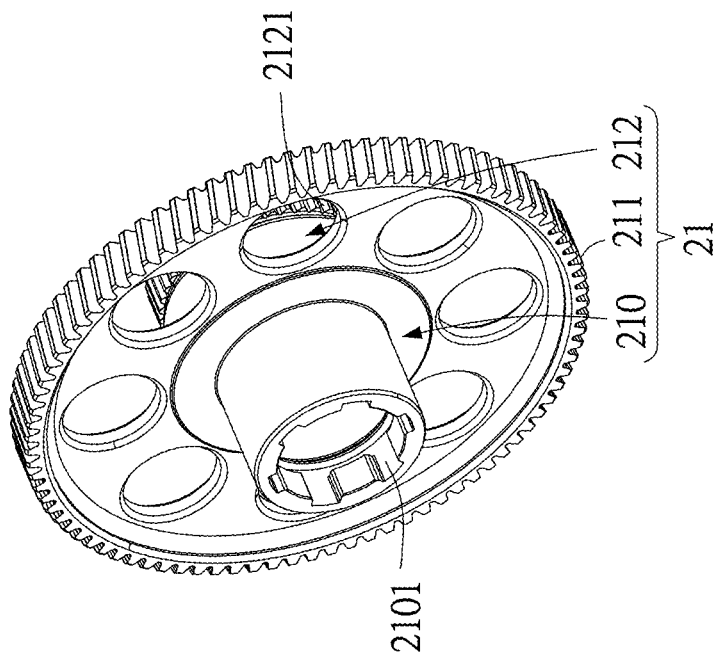
FIG. 5 is a perspective view of a main drive gear according to an embodiment of the present disclosure.
Figure 7:
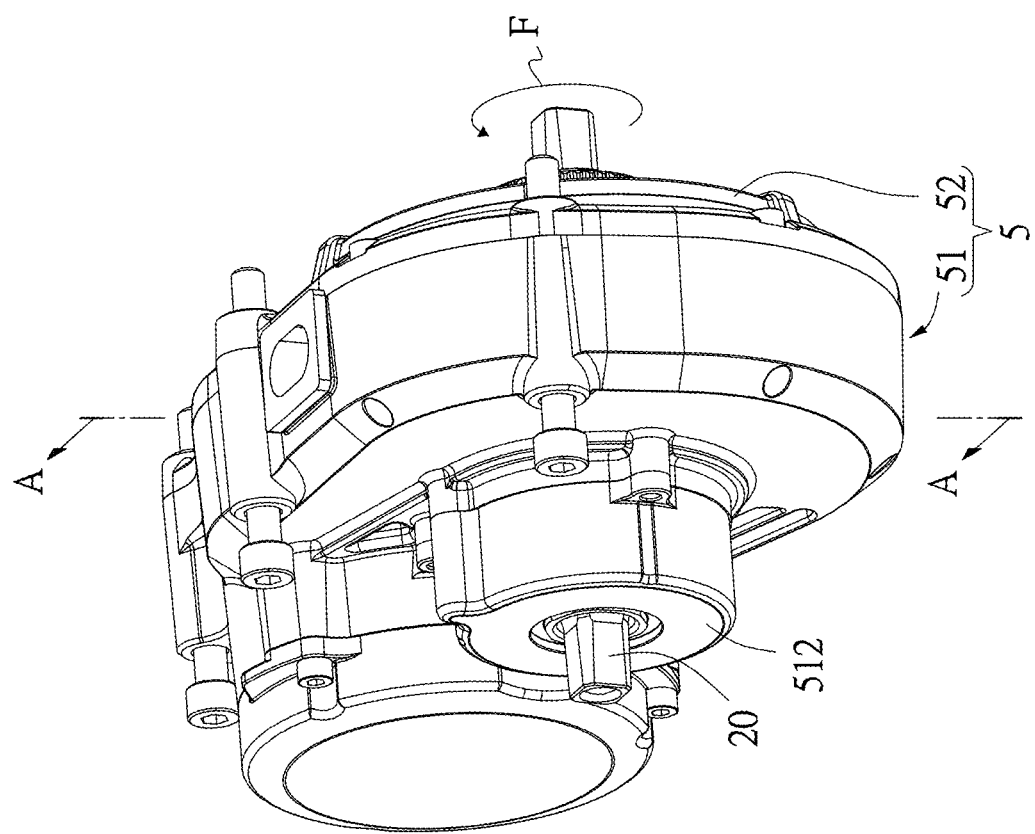
FIG. 7 is a schematic view of fitting the pedal force detection mechanism, crankshaft, auxiliary power assembly, and shaft housing to each other according to an embodiment of the present disclosure.
Figure 8:
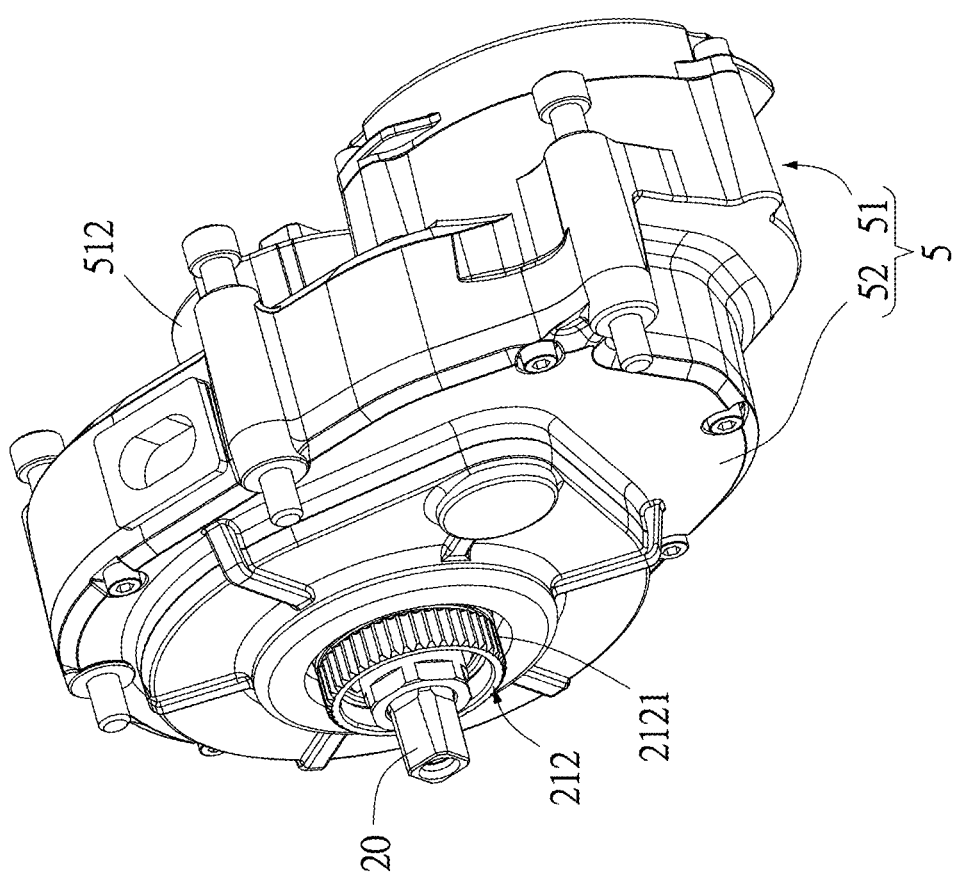
FIG. 8 is another schematic view of fitting the pedal force detection mechanism, crankshaft, auxiliary power assembly, and shaft housing to each other according to an embodiment of the present disclosure.

To facilitate understanding of the object, characteristics, and effects of the present disclosure, embodiments together with the attached drawings for the detailed description of the present disclosure are provided.

Referring to FIG. 1 through FIG. 10, the disclosure provides a pedal force detection mechanism for an electric-assisted bicycle. The pedal force detection mechanism is adapted to be received in a shaft housing 5 of the electric-assisted bicycle to coordinate with a crankshaft 20 and connect to an auxiliary power assembly 3. The crankshaft 20 is movably disposed at the shaft housing 5. The shaft housing 5 comprises a combination of a first shaft housing 51 and a second shaft housing 52. The first shaft housing 51 comprises a positioning chamber 511 and an annular cover 512. The annular cover 512 covers the positioning chamber 511. The crankshaft 20 is penetratingly disposed at the annular cover 512 and the positioning chamber 511 of the first shaft housing 51 and the second shaft housing 52. Alternatively, the shaft housing 5 is a shaft housing of any other structure. The auxiliary power assembly 3 comprises a combination of an auxiliary power source 31, a first deceleration gear 32, and a second deceleration gear 33. Alternatively, the auxiliary power assembly 3 is an auxiliary power mechanism of any other type. The pedal force detection mechanism comprises a torque-transmitting member 1, a main thrust bearing 13, a strain sensing assembly 14, and a main drive gear 21. The torque-transmitting member 1 transmits a torque F of the crankshaft 20 unidirectionally and diverts the torque F along the axial direction of the crankshaft 20. The torque-transmitting member 1 comprises a combination of a single-directional roller clutch 10, an active end-face cam 11 and a passive end-face cam 12 to transmit the torque F of the crankshaft 20 unidirectionally and divert the torque F along the axial direction of the crankshaft 20. A shaft-supporting member 111 is disposed between the active end-face cam 11 and the positioning chamber 511 of the first shaft housing 51. Alternatively, the torque-transmitting member 1 is a treading force diverting mechanism of any other type. The main thrust bearing 13 abuts against the torque-transmitting member 1 to transmit the torque F diverted. The main thrust bearing 13 abuts against a backing plate 121 of the passive end-face cam 12 of the torque-transmitting member 1 or abuts against a torque-transmitting member of any other type to transmit the torque F diverted. The strain sensing assembly 14 has a strain gauge 16, a resilient ring-shaped base 15 and a supporting annular base 17. The supporting annular base 17 is made of, for example, steel, disposed outside the passive end-face cam 12 of the torque-transmitting member 1, and adapted to abut against the bottom of the positioning chamber 511 of the shaft housing 5. An axial-strain gap 6 is defined between the supporting annular base 17 and the main thrust bearing 13. The resilient ring-shaped base 15 is made of, for example, aluminum and disposed outside the supporting annular base 17. An annular top surface 151 and an annular bottom surface 152 of the resilient ring-shaped base 15 abut against the main thrust bearing 13 and the supporting annular base 17 respectively, allowing the resilient ring-shaped base 15 to be fitted between the main thrust bearing 13 and the supporting annular base 17. The strain gauge 16 is disposed on the outer circumferential surface of the resilient ring-shaped base 15 and is in signal connection with the auxiliary power assembly 3. The strain gauge 16 is connected to a control circuit of the auxiliary power assembly 3 by wireless (for example, RFID, infrared, or radio communication) or wired connection. The main drive gear 21 is movably disposed between the crankshaft 20 and the shaft housing 5 and movably disposed between the positioning chamber 511 of the first shaft housing 51 and the second shaft housing 52. The crankshaft 20 is penetratingly disposed at the main drive gear 21. The main drive gear 21 has a main gear 211, an internally-connected ring body 210 and an externally-connected ring body 212. The internally-connected ring body 210 and the main gear 211 are integrally formed with each other, with the internally-connected ring body 210 located on the inner side of the main gear 211. An inner shaft bearing 217 is disposed between the crankshaft 20, the internally-connected ring body 210 and the main gear 211. The externally-connected ring body 212 is fixedly connected to the outer side of the main gear 211. An outer shaft bearing 218 is disposed between the externally-connected ring body 212 and the second shaft housing 52 and penetratingly disposed at the second shaft housing 52. An axial spline 2121 of the externally-connected ring body 212 is connected to a chassis (not shown). An axial spline 122 disposed outside the end of the passive end-face cam 12 of the torque-transmitting member 1 is movably connected to an axial spline 2101 disposed inside the end of the internally-connected ring body 210. Thus, the passive end-face cam 12 of the torque-transmitting member 1 and the internally-connected ring body 210 rotate synchronously. An axial-movement gap 7 is defined between the passive end-face cam 12 of the torque-transmitting member 1 and the internally-connected ring body 210. The width of the axial-movement gap 7 is greater than or equal to the width of the axial-strain gap 6. The supporting annular base 17 is disposed outside the junction of the passive end-face cam 12 and the internally-connected ring body 210. The internally-connected ring body 210 is penetratingly disposed at the bottom of the positioning chamber 511 of the first shaft housing 51 so as to be movably connected to the passive end-face cam 12.

As described above, according to the present disclosure, when the crankshaft 20 of the pedal force detection mechanism for an electric-assisted bicycle receives the torque F exerted by the cyclist and transmitted through foot pedals (not shown) and a crank (not shown), the crankshaft 20 drives the active end-face cam 11 through the single-directional roller clutch 10 to rotate unidirectionally to transmit the torque F, and then the active end-face cam 11 drives the passive end-face cam 12 to rotate and push the passive end-face cam 12 toward the crankshaft 20 to undergo axial movement. Thus, the torque F diverts along the axial direction of the crankshaft 20. The passive end-face cam 12 undergoing axial movement toward the crankshaft 20 pushes the main thrust bearing 13, and then the main thrust bearing 13 pushes the annular top surface 151 of the resilient ring-shaped base 15. Since the annular bottom surface 152 of the resilient ring-shaped base 15 is blocked by the back of the supporting annular base 17 and the bottom of the positioning chamber 511 of the shaft housing 5, the resilient ring-shaped base 15 deforms. After that, a piezoelectric material in the strain gauge 16 generates strain and undergoes voltage variation because of the deformation of the resilient ring-shaped base 15. Next, torque is calculated according to the voltage variation. Then, the strain gauge 16 senses a torque generated under the torque F. If the torque generated under the torque F is greater than or equal to a predetermined torque, the auxiliary power source 31 will output auxiliary power to the main gear 211 through the first deceleration gear 32 and the second deceleration gear 33 to assist the cyclists in riding bicycles easily and effortlessly.

Figure 13:
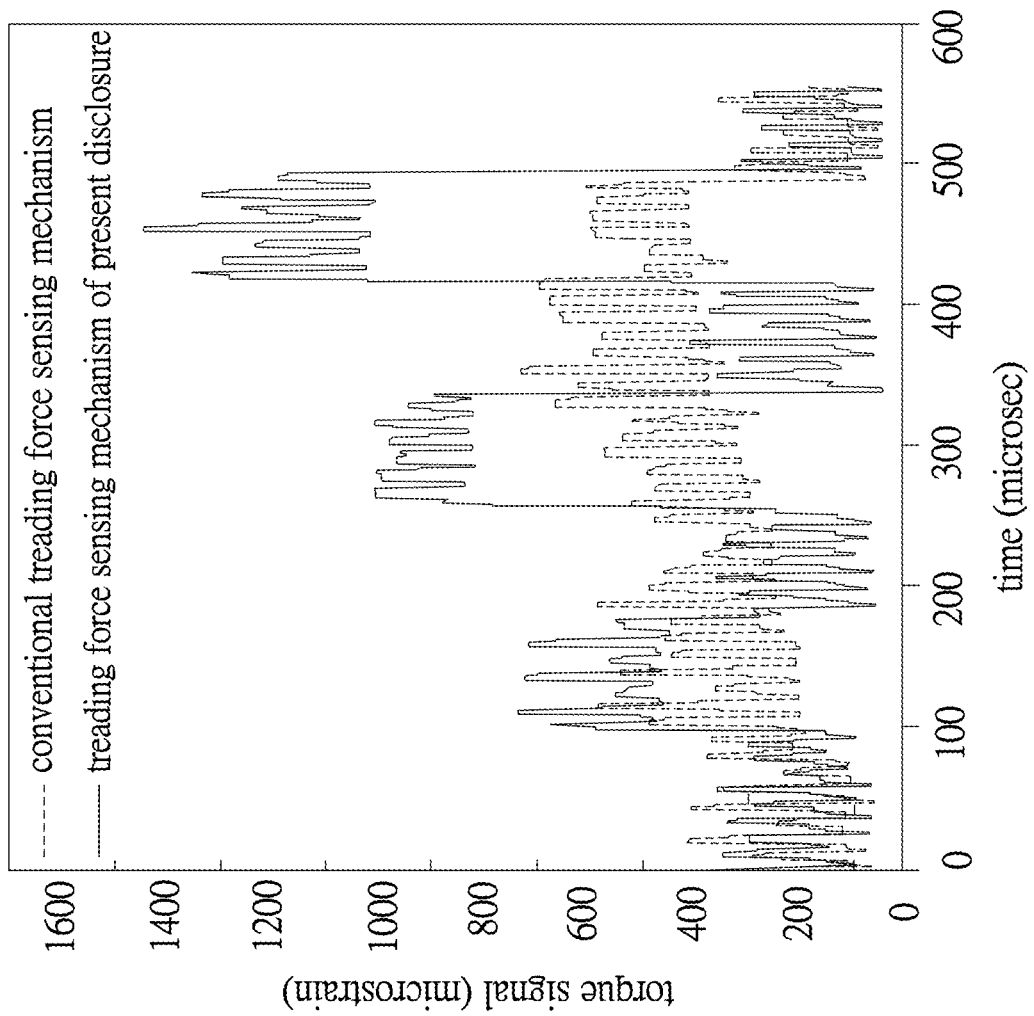
FIG. 13 is a schematic view of comparison of a conventional pedal force detection mechanism and the pedal force detection mechanism of the present disclosure in terms of torque.

As described above, upon deformation of the resilient ring-shaped base 15, the axial-strain gap 6 defined between the front of the supporting annular base 17 and the main thrust bearing 13 causes the supporting annular base 17 to underpin the main thrust bearing 13 immediately before the deformation of the resilient ring-shaped base 15 outstrips the axial-strain gap 6, preventing the resilient ring-shaped base 15 from undergoing permanent deformation which might otherwise occur whenever the main thrust bearing 13 causes the resilient ring-shaped base 15 to deform excessively. With the axial-movement gap 7 being defined between the passive end-face cam 12 of the torque-transmitting member 1 and the internally-connected ring body 210 and greater than or equal to the axial-strain gap 6, the active end-face cam 11 pushes the passive end-face cam 12 to move in the axial direction of the crankshaft 20. Therefore the passive end-face cam 12 undergoes axial movement freely to enable the resilient ring-shaped base 15 to correctly deformation, allowing the strain gauge 16 to correctly sense the torque generated under the torque F. With the internally-connected ring body 210 being integrally formed with the main gear 211 and located on the inner side of the main gear 211. An assembly process entails connecting movably the internally-connected ring body 210 to the passive end-face cam 12 of the torque-transmitting member 1 to not only enhance the ease of assembly but also reduce the processing process of the main drive gear 21. Referring to FIG. 13, the pedal force detection mechanism of the disclosure precisely senses and determines whether a pedal force has been inputted and thus has higher resolution than conventional pedal force detection mechanisms. Furthermore, the pedal force detection mechanism of the present disclosure can sense a pedal force of a great magnitude and thus has a larger sensing range than conventional pedal force detection mechanisms.

Figure 9:
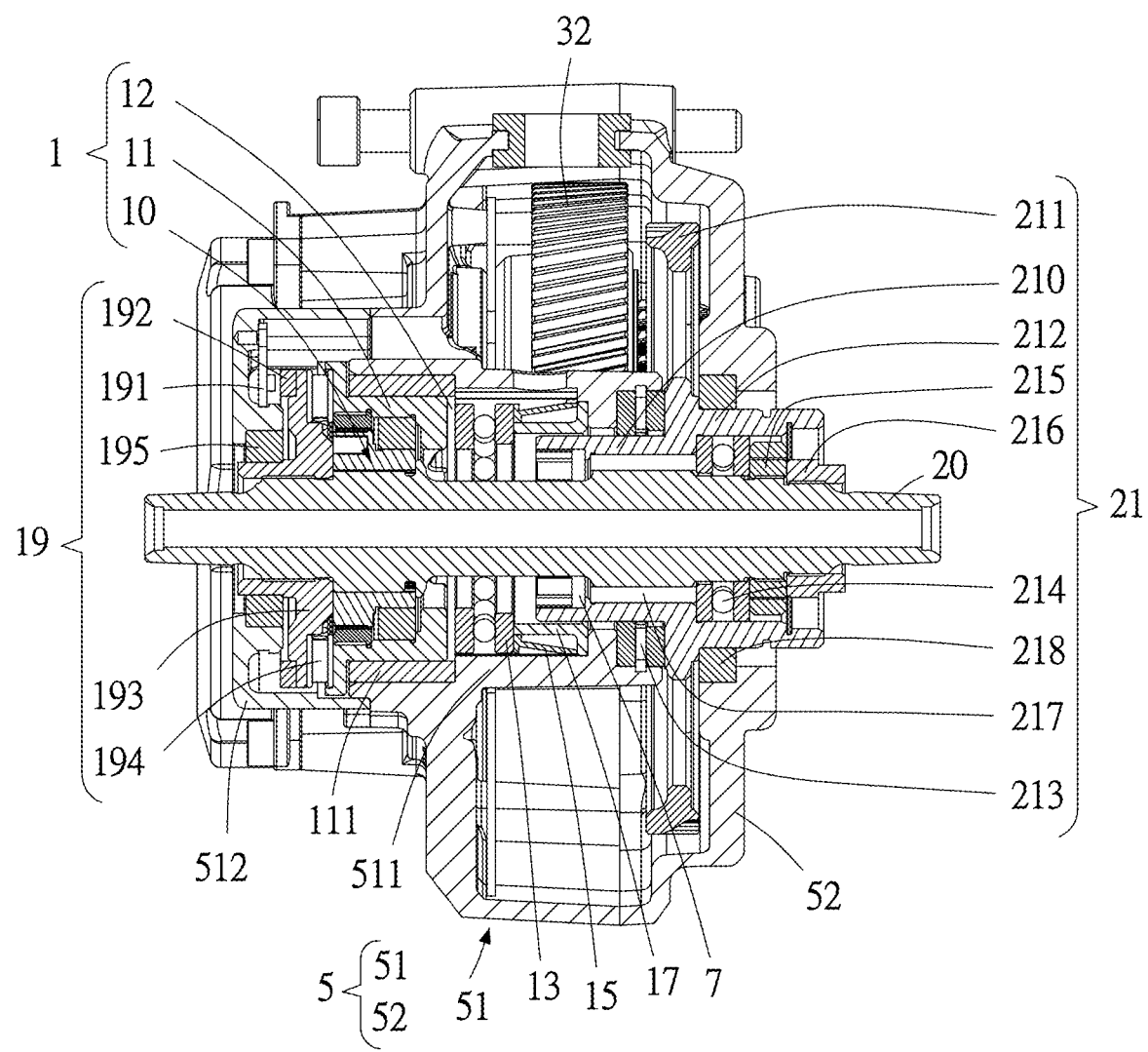
FIG. 9 is a longitudinal cross-sectional view taken along line A-A of FIG. 7.
Figure 10:
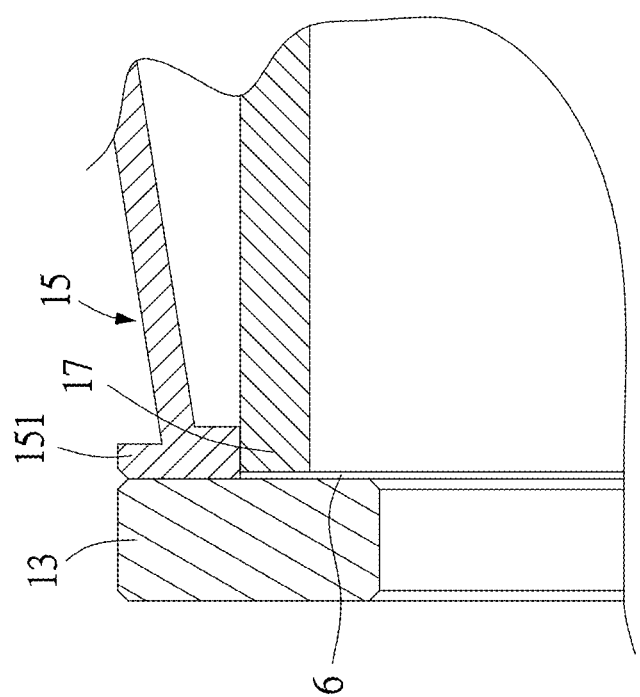
FIG. 10 is a schematic view of an axial-strain gap according to an embodiment of the present disclosure.
Figure 11:
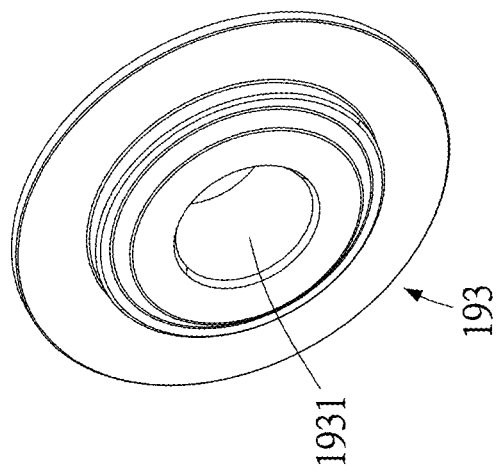
FIG. 11 is a perspective view of an annular gripping component according to an embodiment of the present disclosure.
Figure 12:
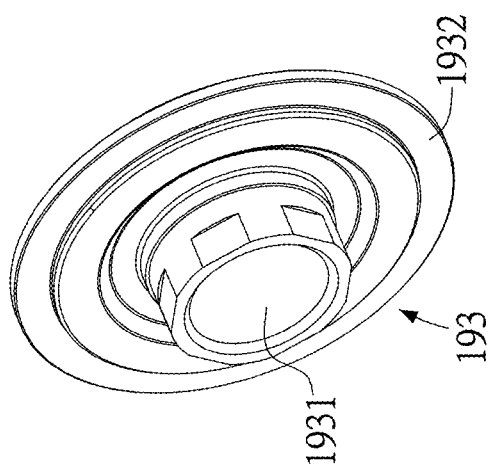
FIG. 12 is another perspective view of the annular gripping component according to an embodiment of the present disclosure.

Referring to FIG. 9, in an embodiment illustrated by the diagram, the main thrust bearing 13 is a ball thrust bearing. Therefore, the main thrust bearing 13 of the disclosure exhibits enhanced mechanical strength and durability.

Referring to FIG. 1 through FIG. 4 and FIG. 9, in an embodiment illustrated by the diagrams, the supporting annular base 17 has a supporting cylindrical body 171 and a supporting annular flange 172. The axial-strain gap 6 is defined between the front of the supporting cylindrical body 171 and the main thrust bearing 13. The back of the supporting cylindrical body 171 is fixedly connected to the supporting annular flange 172. The supporting annular flange 172 is fitted between the annular bottom surface 152 of the resilient ring-shaped base 15 and the bottom of the positioning chamber 511 of the shaft housing 5. Therefore, the supporting annular base 17 of the disclosure exhibits enhanced mechanical strength and durability.

Referring to FIG. 1, FIG. 2, FIG. 5, FIG. 6 and FIG. 9, in an embodiment illustrated by the diagrams, the main drive gear 21 has a first thrust bearing 213 (for example, a needle roller thrust bearing), a second thrust bearing 214 (for example, a ball thrust bearing), an adjustment nut 215, and a fixation nut 216. The first thrust bearing 213 is fitted between the bottom of the positioning chamber 511 of the shaft housing 5 and the main gear 211. The first thrust bearing 213 is fitted around the internally-connected ring body 210. The second thrust bearing 214 is fitted between the main gear 211 and the adjustment nut 215. The second thrust bearing 214 is fitted around the crankshaft 20 and disposed in the externally-connected ring body 212. The adjustment nut 215 is fastened to the crankshaft 20 and disposed in the externally-connected ring body 212. The fixation nut 216 is fastened to the crankshaft 20 and abuts against the adjustment nut 215. The fixation nut 216 is disposed in the externally-connected ring body 212. The fastening direction of the fixation nut 216 is opposite to the fastening direction of the adjustment nut 215. As described above, according to the present disclosure, the assembly of the pedal force detection mechanism comprises the steps as follows: the adjustment nut 215 is rotated until it is fitted between the crankshaft 20 and the externally-connected ring body 212; when the strain gauge 16 senses a signal (i.e., at the sensing starting point of the strain gauge 16), the fixation nut 216 is rotated until it is fitted between the crankshaft 20 and the externally-connected ring body 212 to fasten the adjustment nut 215 in place. Therefore, the pedal force detection mechanism of the present disclosure is not only easy to assemble but also thereafter effective in confirming whether the strain gauge 16 is functioning well.

Referring to FIG. 1, FIG. 2, FIG. 9, FIG. 11 and FIG. 12, in an embodiment illustrated by the diagrams, the pedal force detection mechanism of the present disclosure further comprises a rotation sensor unit 19. The rotation sensor unit 19 comprises a sensor 191 (for example, an electromagnetic sensor), an annular magnet 192 (for example, a Hall sensing magnet), an annular gripping component 193, a third thrust bearing 194 (for example, a needle roller thrust bearing) and a first shaft bearing 195. The annular gripping component 193 has a fixing hole 1931 fixedly fitted to the crankshaft 20. The third thrust bearing 194 is fitted between the back of the annular gripping component 193 and the active end-face cam 11 of the torque-transmitting member 1. The first shaft bearing 195 is disposed at the annular cover 512 of the shaft housing 5 and fitted to the front of the annular gripping component 193. The annular magnet 192 is disposed in an annular fixing groove 1932 at the front of the annular gripping component 193. The sensor 191 is disposed at the annular cover 512 of the shaft housing 5 to sense the annular magnet 192. Therefore, the pedal force detection mechanism of the present disclosure is advantageous in that the sensor 191 and the annular magnet 192 not only sense the rotation speed of the crankshaft 20 but also sense and determine whether the crankshaft 20 is rotating. It is only when the crankshaft 20 rotates and the torque generated by the torque F is greater than or equal to the predetermined torque that the auxiliary power assembly 3 supplies auxiliary power to preclude unintended acceleration.

The present disclosure is disclosed above by preferred embodiments. However, persons skilled in the art should understand that the embodiments are illustrative of the disclosure only, but shall not be interpreted as restrictive of the scope of the disclosure. Thus, all variations and replacements equivalent to the embodiments shall be deemed falling within the scope of the disclosure. Therefore, the legal protection for the disclosure shall be defined by the appended claims.

What is claimed is:

1. A pedal force detection mechanism for an electric-assisted bicycle, adapted to be received in a shaft housing of the electric-assisted bicycle to coordinate with a crankshaft and connect to an auxiliary power assembly, with the crankshaft movably disposed at the shaft housing, the pedal force detection mechanism comprising:
   a torque-transmitting member for transmitting a torque of the crankshaft unidirectionally and diverting the torque along an axial direction of the crankshaft;
   a main thrust bearing for abutting against the torque-transmitting member to transmit the diverted torque;
   a strain sensing assembly having a strain gauge, a resilient ring-shaped base and a supporting annular base, with the supporting annular base disposed outside the torque-transmitting member and abutting against the shaft housing, allowing an axial-strain gap to be defined between the supporting annular base and the main thrust bearing, the resilient ring-shaped base being disposed outside the supporting annular base and fitted between the main thrust bearing and the supporting annular base, the strain gauge being disposed at the resilient ring-shaped base and in signal connection with the auxiliary power assembly; and
   a main drive gear movably disposed between the crankshaft and the shaft housing and having a main gear, an internally-connected ring body and an outer connection ring, the internally-connected ring body being integrally formed with the main gear and located on an inner side of the main gear, the externally-connected ring body being fixedly connected to an outer side of the main gear, wherein the torque-transmitting member and the internally-connected ring body rotate synchronously, and an axial-movement gap is defined between the torque-transmitting member and the internally-connected ring body.

2. The pedal force detection mechanism of claim 1, wherein the main thrust bearing is a ball thrust bearing.

3. The pedal force detection mechanism of claim 1, wherein the supporting annular base has a supporting cylindrical body and a supporting annular flange, with the axial-strain gap defined between a side of the supporting cylindrical body and the main thrust bearing, and another side of the supporting cylindrical body is fixedly connected to the supporting annular flange, allowing the supporting annular flange to be fitted between the resilient ring-shaped base and the shaft housing.

4. The pedal force detection mechanism of claim 1, wherein the main drive gear has a first thrust bearing, a second thrust bearing, an adjustment nut, and a fixation nut, with the first thrust bearing fitted between the shaft housing and the main gear, the second thrust bearing fitted between the main gear and the adjustment nut, the adjustment nut fastened to the crankshaft, the fixation nut fastened to the crankshaft and abutting against the adjustment nut, allowing a fastening direction of the fixation nut to be opposite to a fastening direction of the adjustment nut.

5. The pedal force detection mechanism of claim 1, further comprising a rotation sensor unit, the rotation sensor unit having a sensor, an annular magnet, an annular gripping component, a third thrust bearing and a first shaft bearing, the annular gripping component being fixedly fitted to the crankshaft, the third thrust bearing being fitted between the annular gripping component and the torque-transmitting member, the first shaft bearing being disposed between the shaft housing and the annular gripping component, the annular magnet being disposed at the annular gripping component, and the sensor being disposed at the shaft housing to sense the annular magnet.

* * * * *